US012776977B2

(12) United States Patent
Pang et al.

(10) Patent No.: US 12,776,977 B2
(45) Date of Patent: Oct. 27, 2026

(54) METADATA PRESERVATION FOR NETWORK TRAFFIC

(71) Applicant: Arista Networks, Inc., Santa Clara, CA (US)

(72) Inventors: James C Pang, Vancouver (CA); Vijay Rangarajan, Fremont, CA (US)

(73) Assignee: Arista Networks, Inc., Santa Clara, CA (US)

( * ) Notice: Subject to any disclaimer, the term of this patent is extended or adjusted under 35 U.S.C. 154(b) by 204 days.

(21) Appl. No.: 18/590,157

(22) Filed: Feb. 28, 2024

(65) Prior Publication Data

US 2025/0274368 A1 Aug. 28, 2025

(51) Int. Cl.
*H04L 43/10* (2022.01)
*H04L 12/46* (2006.01)
*H04L 69/22* (2022.01)

(52) U.S. Cl.
CPC .......... *H04L 43/10* (2013.01); *H04L 12/4633* (2013.01); *H04L 69/22* (2013.01)

(58) Field of Classification Search
CPC ...... H04L 12/4633; H04L 43/10; H04L 69/22
See application file for complete search history.

(56) References Cited

U.S. PATENT DOCUMENTS

2014/0177428 A1* 6/2014 Sinha ...................... H04L 43/12 370/216
2014/0280884 A1* 9/2014 Searle ..................... H04L 43/20 709/224
2017/0099197 A1* 4/2017 Raney ................. H04L 12/4633
2019/0028424 A1* 1/2019 Mittal ..................... H04L 45/74
2020/0366578 A1* 11/2020 Punj ...................... H04L 43/028
2021/0281443 A1* 9/2021 McConnaughay ... H04L 61/251
2021/0409299 A1 12/2021 Florian et al.
2022/0256646 A1* 8/2022 Prabhakar ............. H04W 84/18
2022/0294712 A1* 9/2022 Rangarajan ............. H04L 69/22
2023/0291607 A1* 9/2023 Patel ................... H04L 12/4633
2024/0430267 A1* 12/2024 Edison ................ H04L 63/1408

FOREIGN PATENT DOCUMENTS

WO 2015005967 A1 1/2015

* cited by examiner

*Primary Examiner* — Melanie Jagannathan
(74) *Attorney, Agent, or Firm* — Treyz Law Group, P.C.; Tianyi He

(57) ABSTRACT

A network device may receive a packet having a tunneling header. The tunneling header may include metadata. The network device may transcode the metadata for insertion into an Ethernet frame. The network device may output the Ethernet frame containing the transcoded metadata.

20 Claims, 10 Drawing Sheets

METADATA PRESERVATION FOR NETWORK TRAFFIC

BACKGROUND

A communications system includes multiple network devices that are interconnected to form a network for conveying network traffic from source devices to destination devices. As an example, the network traffic can contain data for numerous different services and/or applications. A monitoring system can be coupled to the network to perform analysis on the network traffic.

DETAILED DESCRIPTION

A production network can convey network traffic, e.g., in the form of packets, frames, etc., between hosts or generally between different devices. In some illustrative examples, the network traffic may carry application data being conveyed for various applications (e.g., server-side applications, client-side applications, user applications, network applications, etc.). A monitoring network may be coupled to the production network.

The monitoring network may include network devices such as one or more switches that forward (e.g., tunnel) network traffic tapped from the production network to one or more monitoring tools of the monitoring network such as traffic recording devices, intrusion detection devices, traffic analyzers, etc. In particular, when encapsulating the tapped network packet with a tunneling header for conveyance across the monitoring network, the encapsulating network device (e.g., the filter switch) may include metadata such as a filter switch identifier, an ingress port identifier, a matching policy identifier, timestamp information, and/or other suitable information in the tunneling header. A variety of end hosts (e.g., monitoring tools) may be coupled to the monitoring network, and at least some of these end hosts may be unable to properly process the tunneled packet and/or the tunneling header metadata contained therein. In some scenarios, the original tunneling header information containing the metadata may be removed or replaced (e.g., at the decapsulating network device such as at a delivery switch) prior to reaching the end hosts, thereby facilitating the processing of the tapped network packet without the tunneling header. However, this leads to the loss of the originally generated metadata in the tunneling header.

To preserve the originally generated metadata, a network device such as the delivery switch in the monitoring network may transcode metadata encoded in the packet tunneling header into standard Ethernet header fields prior to delivery to the end host. As examples, various fields in the Ethernet frame header such as the source Media Access Control (MAC) address field, the destination MAC address field, and/or one or more Dot1Q tag fields may include the transcoded metadata and/or an indication of the metadata stored elsewhere on the Ethernet frame (e.g., at a footer). In such a manner, the end hosts of the monitoring network may be configured to access the metadata in the Ethernet frame. An illustrative network having a monitoring network with a network device configured to perform the above-mentioned metadata preservation operation is shown in FIG. 1.

Figure 1:
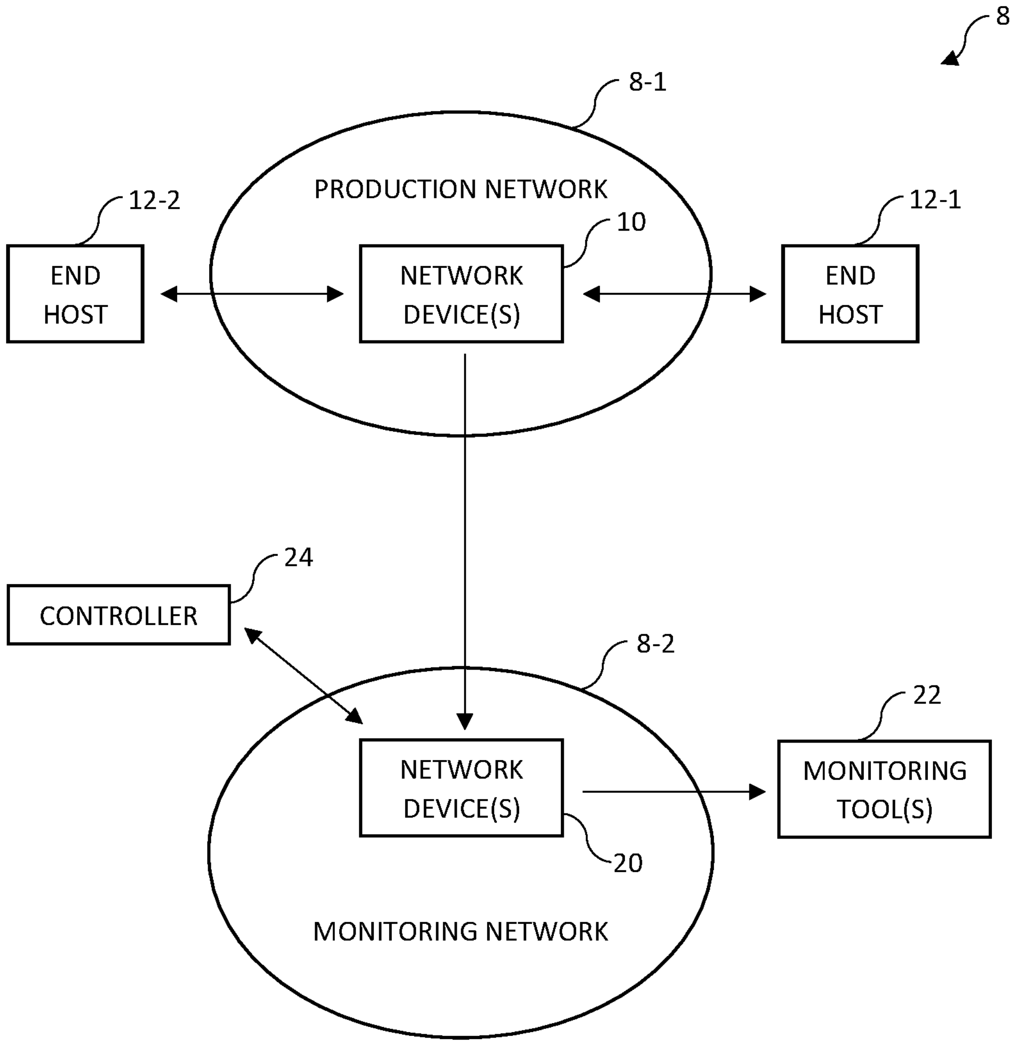
FIG. 1 is a diagram of an illustrative monitoring network coupled to a production network in accordance with some embodiments.

FIG. 1 is a diagram of an illustrative networking system with a communications network 8. Network 8 may be implemented to span a range of geographical locations or generally be implemented with any suitable scope. As examples, network 8 may include, be, or form part of one or more local segments, one or more local subnets, one or more local area networks (LANs), one or more campus area networks, a wide area network, etc. In some configurations described herein as an illustrative example, network 8 may include a data center network, a (software-defined) wide area network, and/or other networks. In general, network 8 may include one or more wired portions with network devices interconnected based on wired technologies or standards such as Ethernet (e.g., using copper cables and/or fiber optic cables) and, if desired, one or more wireless portions implemented by wireless network devices (e.g., to form wireless local area network (WLAN) or Wi-Fi networks). If desired, network 8 may include internet service provider networks (e.g., the Internet) or other public service provider networks, private service provider networks (e.g., multiprotocol label switching (MPLS) networks), and/or may other types of networks such as telecommunication service provider networks.

In the example of FIG. 1, network 8 includes a production network such as production network 8-1 and a network traffic monitoring network such as monitoring network 8-2 communicatively coupled to production network 8-1. Monitoring network 8-2 may sometimes be referred to herein as analysis network 8-2, packet monitoring network 8-2, monitoring switch fabric 8-2, or monitoring fabric 8-2. Production network 8-1 may sometimes be referred to herein as forwarding network 8-1, production switch fabric 8-1, or production fabric 8-1. Production network 8-1 may, for example, be implemented locally (e.g., at a particular geographical location such as a school or college campus, a server or data farm, a building, a business campus, an airport, a hospital, or other locations) or may be distributed across multiple geographical locations. Monitoring network 8-2 may, for example, be implemented locally (e.g., at the same geographical location as part or all of production network 8-1), may be implemented at a different geographic location than production network 8-1 (e.g., may be remote from network 8-1), and/or may be distributed across multiple locations.

Production network 8-1 may include network devices 10 that forward network traffic between end hosts 12 of production network 8-1 implemented on corresponding host equipment. The host equipment may include client devices, server equipment, and/or other suitable types of computing equipment each running one or more services and/or applications for which data is conveyed across production network 8-1. While not explicitly shown in FIG. 1, a network of network devices 10 may be interconnected with one another within network 8-1 via network paths coupled between corresponding ports of network devices 10. Edge network devices of devices 10 may have ports coupled to host equipment via corresponding paths, while core network devices of devices 10 may have ports coupled to edge network devices.

Network tap devices (sometimes referred to as test access points) may be used to intercept or tap network traffic flows in production network 8-1 and send the intercepted or tapped (e.g., a mirrored version of) network traffic to filter network devices of monitoring network 8-2. The network tap devices may be interposed between and/or implemented on network devices 10 to intercept the network traffic between end hosts 12 (e.g., between end host 12-1 and 12-2). An internal interception point in a given network device 10 may be set up to provide a mirroring session through which the intercepted network traffic is mirrored and the mirrored version of the network traffic is sent to filter network devices. If desired, network device(s) 10 may provide filtered mirroring and/or sampling points to facilitate (optional) traffic filtering in addition to traffic interception.

In other words, interception points may be provided within production network 8-1 in at least two illustrative manners. As a first type of interception points, a number of network tap devices may be included within production network 8-1. As a second type of interception points, a number of mirroring and/or sampling points may be provided with optional traffic filtering capabilities within production network 8-1. To note, the filtering functionality for mirroring and/or sampling points relate to filtering out traffic that should not be mirrored or sampled, whereas the filtering functionality of the filter network devices in monitoring network 8-2 described herein relate to classifying the mirrored or tapped production traffic and directing the mirrored or tapped production traffic based on their classification to one or more appropriate end hosts of monitoring network 8-2. In general, these interception points on devices 10 or generally within network 8-1 may monitor and tap traffic without interfering with normal production network traffic flow in network 8-1.

Monitoring network 8-2 may include network devices 20 that are controlled by monitoring network controller 24 communicatively coupled to devices 20 via corresponding control paths (e.g., network paths in network 8-2). If desired, some of network devices 10 in production network 8-1 may also communicate with controller 24 or may communicate with a different controller (not shown) to receive control and/or configuration data for implementing traffic monitoring policy.

While not explicitly shown in FIG. 1, a network of network devices 20 may be interconnected with one another within network 8-2 via network paths coupled between corresponding ports of network devices 20. In particular, network devices 20 may convey tapped network traffic from production network 8-1 along network paths in monitoring network 8-2 to one or more end hosts such as monitoring tool(s) 22 of network 8-2 (sometimes generally referred to as end hosts or hosts 22). As examples, monitoring tools 22 may include one or more traffic service devices, one or more traffic analysis devices, one or more traffic monitoring devices, and/or one or more packet recorders for network traffic storage or other devices for network traffic metadata storage. Controller 24 may be communicatively coupled to and control network devices 20 and/or monitoring tools 22 via network or non-network paths to help ensure appropriate network monitoring.

An analysis device serving as a monitoring tool 22 may be implemented on computing equipment and configured to perform network analysis operations on traffic tapped from production network 8-1. As examples, the analysis devices may include network analysis tools such as network performance monitors, network capacity analysis tools, network outage analysis tools, or other network analysis tools for analyzing production network 8-1 based on tapped network traffic flows forwarded by network devices 20. A service device serving as a monitoring tool 22 may be implemented on computing equipment configured to perform traffic servicing operations on traffic tapped from production network 8-1. As an example, the service devices may serve to manipulate or modify the tapped network traffic flows (e.g., prior to analysis by the analysis devices). In particular, the service devices may manipulate network traffic flows by replacing, removing, or otherwise modifying information stored in network packets of the tapped traffic. The service devices may, for example, include packet slicing tools, timestamping tools, or other tools. A traffic monitoring device serving as a monitoring tool may be implemented on computing equipment and configured to perform traffic monitoring operations on traffic flows in production network 8-1 based on tapped traffic flows. The traffic monitoring devices may include network traffic monitoring tools such as network visibility tools or other network monitoring tools for monitoring traffic in production network 8-1. Visibility tools on the traffic monitoring devices may include, for example, application performance monitoring tools (e.g., tools that monitor the performance of software applications running on end hosts 12 and/or performance of devices 10), intrusion detection tools, security tools (e.g., tools for monitoring the security of production network 8-1 and the network traffic passing through production network 8-1), or any other desired monitoring tools. Multiple tools may be implemented at a given end host of network 8-2.

The analysis devices, service devices, traffic monitoring devices, data recorder devices, and/or other types of monitoring network end hosts may be formed on separate pieces of host equipment (e.g., separate computers, separate servers, or generally separate computing equipment) or two or more of these end host devices may be formed on the same (shared) host equipment (e.g., the same computer, the same server, or generally the same computing equipment). If desired, two or more of these end host devices may be implemented on separate integrated circuits or using separate processors and storage on the same computer or server (e.g., on the same end host of monitoring network 8-2). If desired, one or more of these types of end host devices (e.g., analysis devices, service devices, monitoring devices, data recorder devices, etc.) may be omitted.

Network devices 10 in network 8-1 and network devices 20 in network 8-2 may include any suitable number and/or type of network devices interconnected via corresponding port-to-port (or generally interface-to-interface) connections. As examples, network devices 10 and 20 may include one or more switches (e.g., single-layer (Layer 2) switches and/or multi-layer (Layer 2 and Layer 3) switches), one or more bridges, one or more routers and/or gateways, one or more hubs, one or more repeaters, one or more firewalls, one or more wireless access points, one or more devices serving other networking functions, one or more devices that include the functionality of two or more of these devices, and management equipment that manage and control the operation of one or more of these network devices.

Host equipment forming the end hosts 12 of network 8-1 and/or end hosts 22 of network 8-2, computing equipment on which controller 24 is implemented, and/or some of network devices 10 and 20 may include or be implemented on computers, servers (e.g., server computing equipment housed in server racks), portable electronic devices such as cellular telephones, laptops, etc., and/or any other suitable types of specialized or general-purpose computing equipment, e.g., each running one or more client-side and/or server-side applications.

In some illustrative configurations described herein as an example, at least some of computing equipment forming hosts 12 and 22 may be implemented on corresponding server computing equipment, e.g., each containing services running on one or more virtual machine instances. In this example, a host resource management system may be provided to instantiate and/or otherwise manage the creation, modification, and destruction of computing resources such as virtual machines formed on the computing equipment for hosts 12 and 22.

Figure 2A:
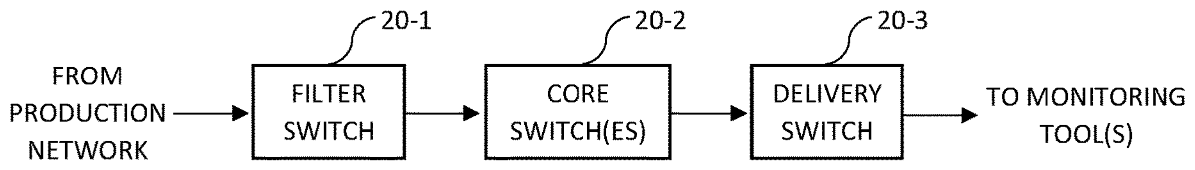
FIGS. 2A-2C are diagrams of illustrative network configurations for a monitoring network in accordance with some embodiments.
Figure 2B:
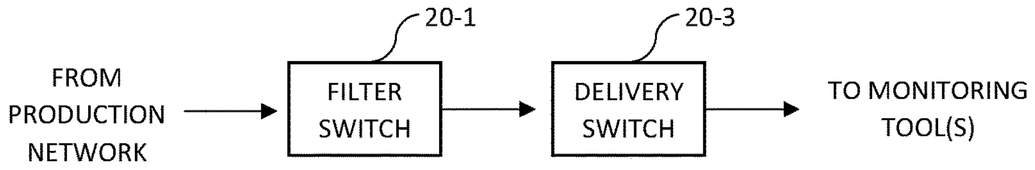
Figure 2C:
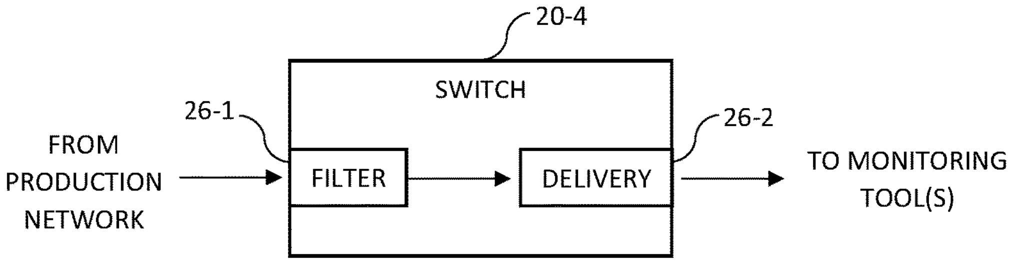

Monitoring network 8-2 may be implemented using and include a variety of different topologies. FIGS. 2A-2C are diagrams of three illustrative network configurations for conveying tapped network traffic from production network 8-1 to end hosts 22 of monitoring network 8-2.

In the example of FIG. 2A, monitoring network 8-2 may include at least three network devices such as a filter network device (e.g., filter switch 20-1), a delivery network device (e.g., delivery switch 20-3), and one or more core network devices (e.g., one or more core switches 20-2) coupled between the filter network device and the delivery network device. In other words, filter switch 20-1 may receive network traffic tapped or mirrored from an interception point within production network 8-1 at an ingress port (sometimes referred to as a filter port implementing a filter interface) of switch 20-1 and may classify and direct the network traffic toward one or more monitoring network end hosts. Filter switch 20-1 may forward the tapped or mirrored network traffic to delivery switch 20-3 via core switch(es) 20-2. Delivery switch 20-3 may deliver the tapped or mirrored network traffic to one or more end hosts 22 of monitoring network 8-2 (e.g., to monitoring tool(s)).

In the example of FIG. 2B, monitoring network 8-2 may include two network devices such as a filter network device (e.g., filter switch 20-1) and a deliver network device (e.g., delivery switch 20-3) without any intervening core network devices. Filter switch 20-1 may receive network traffic tapped or mirrored from an interception point within production network 8-1 at an ingress port (sometimes referred to as a filter port implementing a filter interface) and may forward the tapped or mirrored network traffic to delivery switch 20-3. Delivery switch 20-3 may deliver the tapped or mirrored traffic to one or more end hosts 22 of monitoring network 8-2 (e.g., to monitoring tool(s)).

In the example of FIG. 2C, monitoring network 8-2 may include a network device such as switch 20-4 having a first port configured as (filter) input-output interface 26-1 and a second port configured as (delivery) input-output interface 26-2. Switch 20-4 may be referred to herein sometimes as a filter switch and as a delivery switch. Switch 20-4 may receive network traffic tapped or mirrored from an interception point within production network 8-1 at ingress or filter interface 26-1 and may deliver (e.g., egress) the tapped or mirrored network traffic at egress or delivery interface 26-2 to one or more end hosts 22 of monitoring network 8-2 (e.g., to monitoring tool(s)).

The examples of FIGS. 2A-2C for implementing monitoring network 8-2 are merely illustrative. If desired, a combination of the types of devices and connections in FIGS. 2A-2C may be used in monitoring network 8-2 (e.g., to connect to different end hosts 22). If desired, one or more monitoring tools may be directly attached to port(s) of core switch(es) and receive traffic directly from the core switches without intervening delivery switch(es).

Figure 3:
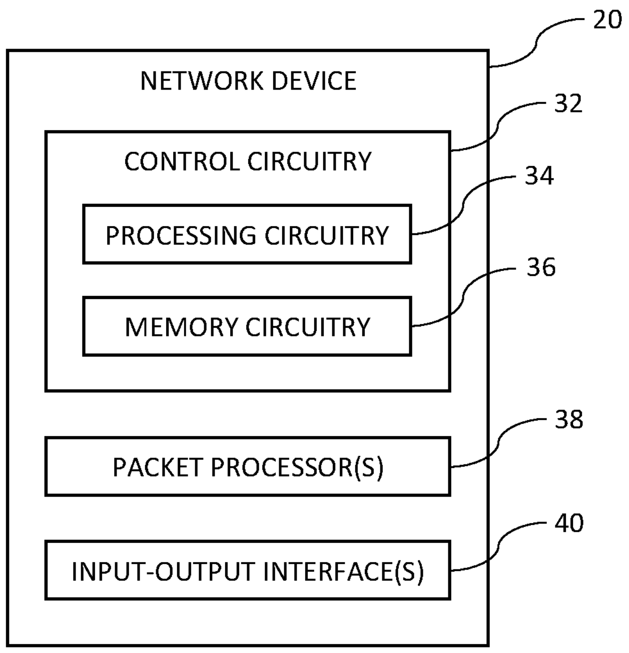
FIG. 3 is a diagram of an illustrative network device in accordance with some embodiments.

An illustrative implementation for a network device implementing one or more of network devices 10 and 20 (e.g., switches 20-1, 20-2, 20-3, and 20-4 in FIGS. 2A-2C) is shown in FIG. 3. Configurations in which network device 20 of FIG. 3 implements network devices 20 in FIG. 1 are sometimes described herein as illustrative examples. In the example of FIG. 3, network device 20 may be a switch (e.g., a Layer 2 switch or a Layer 2 and Layer 3 switch implementing one or more of switches 20-1, 20-2, 20-3, and 20-4), a router or gateway, a bridge, a hub, a repeater, a firewall, a wireless access point, a network management device that manages one or more other network devices, a device serving other networking functions, a device that includes a combination of these functions, or other types of network devices.

Network device 20 may include control circuitry 32 having processing circuitry 34 and memory circuitry 36, one or more packet processors 38, and input-output interfaces 40. In one illustrative arrangement, network device 20 may be or form part of a modular network device system (e.g., a modular switch system having removably coupled modules usable to flexibly adjust system capabilities such as adjust the network traffic processing capabilities by changing the number of processors, memory, and/or other hardware components, adjust the number of ports, add or remove specialized functionalities, etc.). In another illustrative arrangement, network device 20 may be a fixed-configuration network device (e.g., a fixed-configuration switch having a fixed number of ports and/or a fixed hardware configuration) .

Processing circuitry 34 may include one or more processors or processing units based on central processing units (CPUs), based on graphics processing units (GPUs), based on microprocessors, based on general-purpose processors, based on host processors, based on microcontrollers, based on digital signal processors, based on programmable logic devices such as a field programmable gate array (FPGA) device, based on application specific system processors (ASSPs), based on application specific integrated circuit (ASIC) processors, and/or based on other processor architectures.

Processing circuitry 34 may run (e.g., execute) a network device operating system and/or other software/firmware that is stored on memory circuitry 36. Memory circuitry 36 may include one or more non-transitory (tangible) computer readable storage media that stores the operating system software and/or any other software code, sometimes referred to as program instructions, software, data, instructions, or code. As an example, network device control plane functions may be stored as (software) instructions on the one or more non-transitory computer-readable storage media (e.g., in portion(s) of memory circuitry 36 in network device 20). The corresponding processing circuitry (e.g., one or more processors of processing circuitry 34 in network device 20) may process or execute the respective instructions to perform the corresponding operations. Memory circuitry 36 may be implemented using non-volatile memory (e.g., flash memory or other electrically-programmable read-only memory configured to form a solid-state drive), volatile memory (e.g., static or dynamic random-access memory), hard disk drive storage, and/or other storage circuitry. Processing circuitry 34 and memory circuitry 36 as described above may sometimes be referred to collectively as control circuitry 32 (e.g., implementing a control plane of network device 20).

In particular, processing circuitry 34 may execute network device control plane software such as operating system software, routing policy management software, routing protocol agents or processes, routing information base agents, and other control software, may be used to support the operation of protocol clients and/or servers (e.g., to form some or all of a communications protocol stack such as the Transmission Control Protocol (TCP) and Internet Protocol (IP) stack), may be used to support the operation of packet processor(s) 38, may store packet forwarding information, may execute packet processing software, and/or may execute other software instructions that control the functions of network device 20 and the other components therein.

Packet processor(s) 38 may be used to implement a data plane or forwarding plane of network device 20. Packet processor(s) 38 may include one or more processors or processing units based on central processing units (CPUs), based on graphics processing units (GPUs), based on microprocessors, based on general-purpose processors, based on host processors, based on microcontrollers, based on digital signal processors, based on programmable logic devices such as a field programmable gate array (FPGA) device, based on application specific system processors (ASSPs), based on application specific integrated circuit (ASIC) processors, and/or based on other processor architectures.

Packet processor 38 may receive incoming data packets via input-output interfaces 40, parse and analyze the received data packets, process the packets based on packet forwarding decision data (e.g., in a forwarding information base) and/or in accordance with network protocol(s) or other forwarding policy, and forward (or drop) the data packet accordingly. The packet forwarding decision data may be stored on a portion of memory circuitry 36 and/or other memory circuitry integrated as part of or separate from packet processor 38.

To interact with external devices, external systems, and/or users, network device 20 may include input-output interfaces 40 formed from corresponding input-output devices (sometimes referred to as input-output circuitry or interface circuitry). Input-output interfaces 40 may include different types of communication interfaces such as Ethernet interfaces (e.g., formed from one or more Ethernet ports), optical interfaces (e.g., formed from removable optical modules containing optical transceivers), Bluetooth interfaces, Wi-Fi interfaces, and/or other network interfaces for connecting device 20 to the Internet, a local area network, a wide area network, a mobile network, generally network device(s) in these networks, and/or other computing equipment (e.g., end hosts, server equipment, user devices, etc.). As an example, some input-output interfaces 40 (e.g., those based on wireless communication) may be implemented using wireless communication circuitry (e.g., antennas, transceivers, radios, etc.).

As another example, some input-output interfaces 40 (e.g., those based on wired communication) may be implemented on physical ports. These physical ports may be configured to physically couple to and/or electrically connect to corresponding mating connectors of external components or equipment (e.g., cables, pluggable optical transceiver modules, etc.). Different ports may have different form-factors to accommodate different cables, different modules, different devices, or generally different external equipment.

In some configurations described herein as an example, network devices 20 in network 8-2 may be configured to implement tunneling technology to convey network packets tapped from production network 8-1 to end hosts 22 of monitoring network 8-2. Network devices 20 may be configured to facilitate the use of tunnels by encapsulating tapped traffic with a tunneling header, processing and conveying the tunneled tapped traffic, and decapsulating the tunneling header. Advantageously, this use of tunneling may enable the simplification of the monitoring network and allow for the possibility of carrying monitoring traffic in the production network itself, if desired, without interfering with other types of carried traffic. Additionally, to provide context and/or other information associated with the tapping or sampling of the production network traffic into monitoring network 8-2, the tunneling header of the tapped network traffic may be implemented to include metadata indicative of contextual information or other types of information. In other words, advantageously, the use of tunneling may also allow for additional space, afforded by the tunneling header, to carry a variety of metadata. Some monitoring network end hosts (e.g., monitoring tools) may also be configured to directly accept and digest the tunneled network traffic, while other monitoring network end hosts may not be configured to accept and digest the tunneled network traffic. Metadata transcoding as described herein may be performed for these other monitoring network end hosts.

Figure 4:
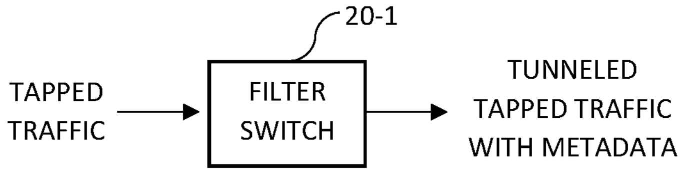
FIG. 4 is a diagram of illustrative processing of tapped network traffic by a filter network device in accordance with some embodiments.

FIG. 4 is a diagram of an illustrative filter network device in monitoring network 8-2 configured to process network traffic tapped or otherwise mirrored from production network 8-1. In particular, a filter network device such as filter switch 20-1 may include a first input-output interface (e.g., an interface 40 in FIG. 3) configured to receive the network traffic from an interception point (e.g., a network tap device, a mirroring point, a sampling point, etc.) within production network 8-1. Based on a matching policy (sometimes referred to herein as a monitoring policy), filter switch 20-1 may classify the tapped network traffic (e.g., having fields that match one or more criteria associated with the matching policy) for conveyance to one or more monitoring network end hosts (e.g., specified by the matching policy). In particular, filter switch 20-1 may include a second input-output interface (e.g., another interface 40 in FIG. 3) that egresses a modified version of the tapped network traffic destined for the monitoring network end host(s). The matching policy may match on any suitable number and/or type of network flows and packet characteristics and, based on a match, take any suitable action (e.g., convey to one or more particular monitoring tools). Filter switch 20-1 may store one or more matching policies each identifiable by a corresponding matching policy identifier.

In some configurations sometimes described herein as an example, the packet processing circuitry (e.g., one or more packet processors 38 in FIG. 3) of switch 20-1 may generate the modified version of the tapped network traffic by encapsulating the tapped network traffic with a tunneling header to generate tunneled tapped network traffic. The packet processing circuitry of switch 20-1 may, as part of the encapsulation process, insert metadata associated with the traffic capture (e.g., associated with the tapping, mirroring, or generally reception of the traffic by monitoring network 8-2) in the tunneling header of tunneled tapped network traffic. Accordingly, the modified version of the tapped traffic egressed at the second interface of switch 20-1 may be the tunneled tapped traffic with metadata in the tunneling header.

The tunneling of the tapped traffic may facilitate more efficient handling and conveyance of the tapped traffic within monitoring network 8-2. The inclusion of metadata associated with the capture of the traffic at the ingress of monitoring network 8-2 (e.g., at switch 20-1) provides end host(s) 22 (FIG. 1), to which the tapped traffic is destined, with additional contextual information (e.g., for network analysis and monitoring).

Figure 5:
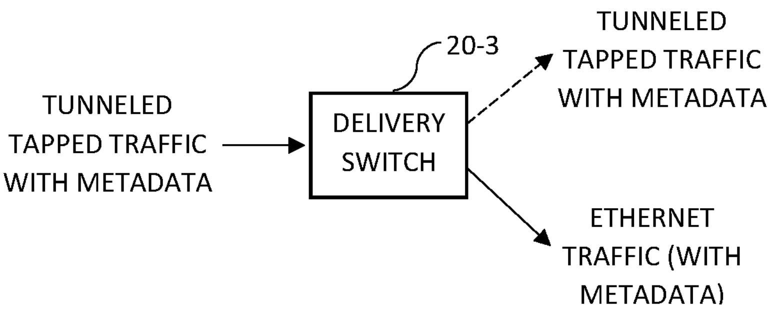
FIG. 5 is a diagram of illustrative processing of tapped network traffic by a delivery network device in accordance with some embodiments.

To facilitate the conveyance of the tunneled tapped traffic with metadata to end host 22 of monitoring network 8-2, a delivery network device may receive and process the tunneled tapped traffic with metadata for delivery to end host(s) 22. FIG. 5 is a diagram of an illustrative delivery network device in monitoring network 8-2 configured to process the tapped traffic encapsulated with a tunneling header by a filter network device (e.g., filter switch 20-1 in FIG. 4). In particular, a delivery network device such as delivery switch 20-3 may include a first input-output interface (e.g., an interface 40 in FIG. 3) configured to receive the tunneled tapped traffic with metadata and a second input-output interface (e.g., another interface 40 in FIG. 3) that egresses the tapped traffic to one or more end hosts 22.

In some instances, packet processing circuitry (e.g., one or more packet processor 38 in FIG. 3) of delivery switch 20-3 may be configured to pass the received tunneled tapped traffic with metadata to end host 22. However, this type of passthrough processing may sometimes be undesirable. As one example, end host 22 may not necessarily be configured to appropriately process the tunneled tapped traffic with metadata (e.g., may be unable to perform decapsulation of the tunneling header, may be unable to obtain metadata from the tunneling header during decapsulation, may be unable to parse the format of the metadata in the tunneling header, etc.). While delivery switch 20-3 may perform the decapsulation of the tunneled tapped traffic prior to egressing the tapped traffic to end host 22, this prevents end host 22 from obtaining the metadata added as part of the tunneling encapsulation (e.g., originally generated at the point of traffic capture at switch 20-1).

It may therefore be desirable to provide end host(s) 22 with tapped network traffic that includes the originally generated metadata in a form digestible by or compatible with the processing operations performed by the end host(s) 22. Monitoring network 8-2 may include one or more network device(s) 20 (e.g., delivery switches 20-3 in FIGS. 2A-2C and FIG. 5) configured to decapsulate the tunneling header of the received tapped traffic and/or to transcode the metadata in the tunneling header for insertion into egressing Ethernet traffic destined for end host(s) 22.

Figure 6:
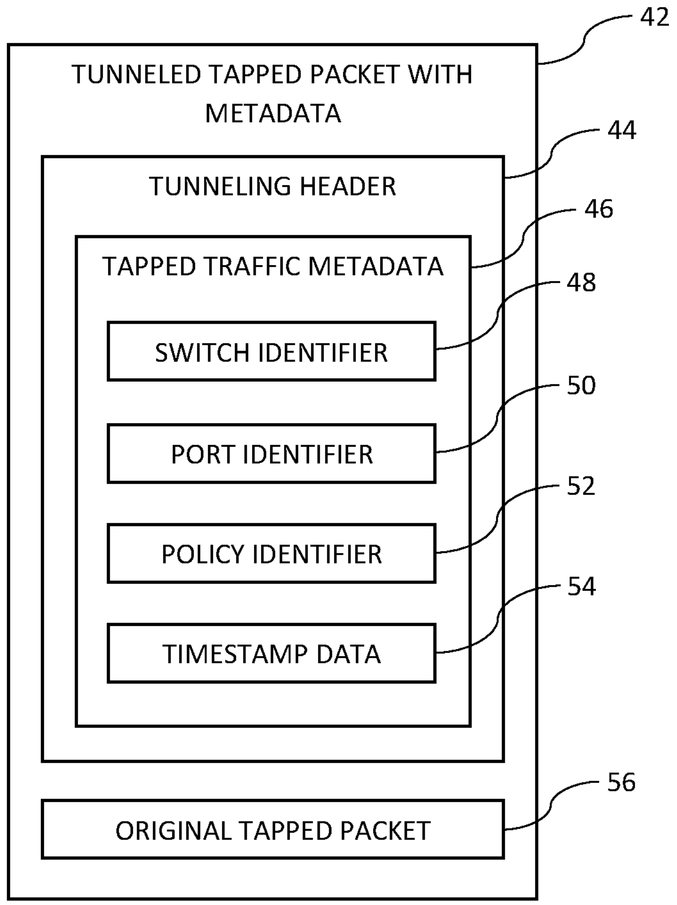
FIG. 6 is a diagram of an illustrative tunneled tapped network packet with metadata in accordance with some embodiments.

FIG. 6 is a diagram of an illustrative tunneled tapped packet containing metadata. As an example, the tunneled tapped packet 42 in FIG. 6 may be egressed by a filter network device (e.g., switch 20-1), forwarded by one or more core network devices (e.g., switch(es) 20-2) if present, and/or received by a delivery network device (e.g., switch 20-3). Packet 42 may include a tunneling header 44. The tunneling header may be a Generic Routing Encapsulation (GRE) header containing GRE header fields, may be a Virtual Extensible Local Area Network (VXLAN) header containing VXLAN header fields, may be modified versions of a VXLAN header, a GRE header, or other types of standardized headers containing additional custom fields and/or custom values in standardized header fields, etc. In configurations described herein as an example, tunneling header 44 may include custom (e.g., vendor-specific) fields carrying custom (e.g., vendor-specific) values. These custom fields and values may contain metadata associated with the tapping of packet 42 or generally the ingress of packet 42 into network 8-2.

As examples, the values at one or more fields of tunneling header 44 may include a (filter) switch identifier indicating switch 20-1 at which the packet from production network 8-1 is first tapped and captured for conveyance to monitoring network end host(s), a (filter switch) port indicating a port of switch 20-1 at which a filter interface is configured and at which the packet is received from production network 8-1, a (matching) policy identifier indicating a traffic sampling or monitoring policy that to which the packet is matched at switch 20-1 for tapping, timestamp data (sometimes referred to herein as timestamp information) that includes a timestamp indicative of a time at which the filter switch received and/or processed (e.g., tapped) the packet (and/or any other timestamps indicative of other times), and/or other types of contextual information associated with the capture (tapping) of the packet. The original tapped packet 56 forwarded through production network 8-1 and its content may be unchanged (or nominally modified) and encapsulated with tunneling header 44 having one or more fields containing one or more types of metadata 46.

If desired, one or more types of metadata shown in FIG. 6 may be omitted from packet 42 and/or other types metadata may be present in packet 42.

As described above in connection with FIG. 5, some end hosts 22 of the monitoring network may be unable to appropriately process packet 42 if received directly. Accordingly, a network device 20 may be configured to receive packet 42 in FIG. 6 and output an Ethernet frame corresponding to the originally tapped packet and having metadata that is transcoded from the corresponding metadata in the tunneling header of packet 42.

Figure 7:
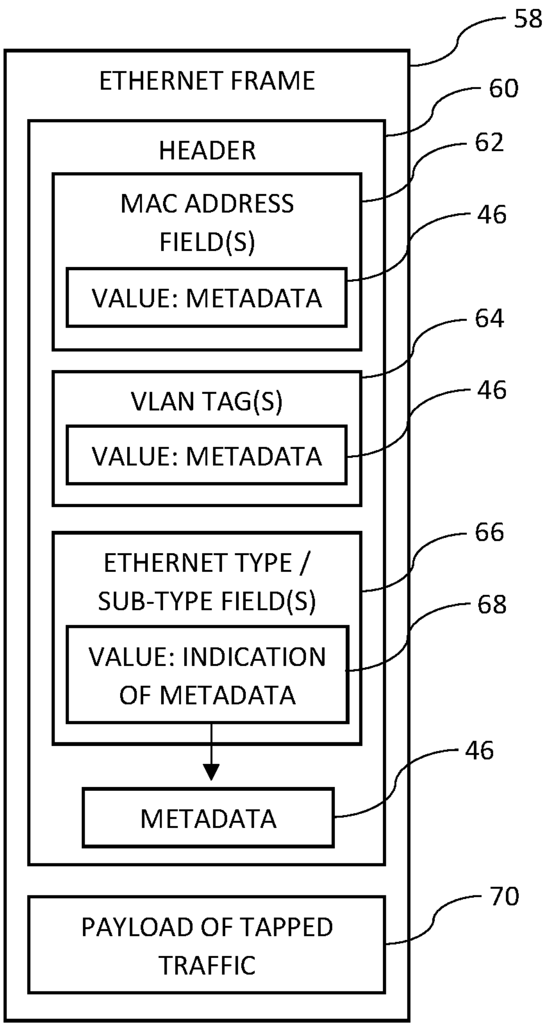
FIG. 7 is a diagram of an illustrative Ethernet frame with metadata transcoded from the tunneled tapped network packet in accordance with some embodiments.

FIG. 7 is a diagram of an illustrative Ethernet frame such as Ethernet frame 58 containing metadata (e.g., transcoded from the metadata in tunneling header 44 in FIG. 6). As an example, the delivery network device may receive packet 42 in FIG. 6 and output Ethernet frame 58 based on packet 42. Ethernet frame 58 may include header 60 that includes, among other fields, source and destination Media Access Control (MAC) address fields 62, one or more Dot1Q tags 64 (sometimes referred to herein as identity tags or Virtual Local Area Network (VLAN) tags) each having a number of VLAN tag fields, and an Ethernet type field 66 (sometimes referred to as Ethertype field 66), and optionally, an Ethernet sub-type field 66. When transcoding the original metadata 46 in tunneled tapped packet 42 (FIG. 6), the delivery network device may insert the transcoded (versions of) metadata 46 and/or an indication of metadata 46 as values in some of the Ethernet frame header fields.

Some types of metadata 46 may be inserted as value(s) for source and/or destination MAC address field 62, some types of metadata 46 may be inserted as a value for the Dot1Q tag fields of one or more VLAN tags 64, and/or one or more indications 68 (indicating the presence and/or type of metadata 46) may be inserted as value(s) for Ethernet type and sub-type fields 66 and metadata 46 may follow Ethernet type and sub-type fields 66. In particular, an Ethernet type field 66 may contain a value associated with the insertion of a vendor-specific attribute (e.g., metadata) and an Ethernet sub-type field 66 may contain a value indicating a type of the inserted vendor-specific attribute (e.g., a format of inserted metadata 46). Indications 68 may generally indicate the presence, format (e.g., a length or number of bits for the metadata), location (e.g., outside of fields 62 and 64, outside of header 60, within a body or footer of frame 58, etc.), and/or other characteristic of metadata 46 within frame 58. Ethernet frame 58 may include a payload 70 of the tapped traffic. This payload 70 may be the same or a nominally varied version of the payload in the original tapped packet 56 (FIG. 6).

As examples, switch and port identifiers 48 and 50 in tunneling header 44 (FIG. 6) may be transcoded, mapped, or otherwise converted to a corresponding value that can be included (e.g., that fits) in the fields of a VLAN tag 64 (e.g., as a 12-bit value that fits within the 12-bit VLAN identifier field after the first 4-bit priority field) in frame 58. A matching policy identifier 52 in tunneling header 44 (FIG. 6) may be transcoded, mapped, or otherwise converted to a corresponding value that can be included in the fields of another VLAN tag 64 (e.g., as a 12-bit value that fits within the 12-bit VLAN identifier field after the first 4-bit priority field) in frame 58. If desired, the VLAN tag value associated with and indicative of the switch and port identifiers may be in a first VLAN tag 64, and the VLAN tag value associated with and indicative of the matching policy identifier may be in a second VLAN tag 64. If desired, one of the two VLAN tag values may be omitted.

As further examples, timestamp data 54 such as a timestamp generated by the filter network device to indicate tapping of the original production network packet may be transcoded (e.g., shortened), mapped, or otherwise converted to a corresponding value that can be included (e.g., that fits) in source and/or destination MAC address fields 62 of frame 58. If desired, the timestamp may be unchanged after the conversion operation. A timestamp may be converted to corresponding values having different formats (e.g., timestamp values having different numbers of bits corresponding to different levels of precision). Timestamp values having different numbers of bits may fit and be inserted into different parts of frame 58 (e.g., into source MAC field 60, into another part of header 60, into a footer, etc.). To indicate how a timestamp value or other types of metadata is inserted into frame 58, a corresponding indication 68 of metadata (e.g., indicative of a location and/or length of the inserted timestamp value) may be included in Ethernet type and/or sub-type fields 66. In particular, the value of the Ethernet type field 66 may be used to indicate a presence of timestamp data 54 (e.g., a timestamp value) in frame 58 and the value of the Ethernet sub-type field 66 may be used to indicate a format of timestamp data 54 (e.g., a length of the timestamp value).

Figure 8:
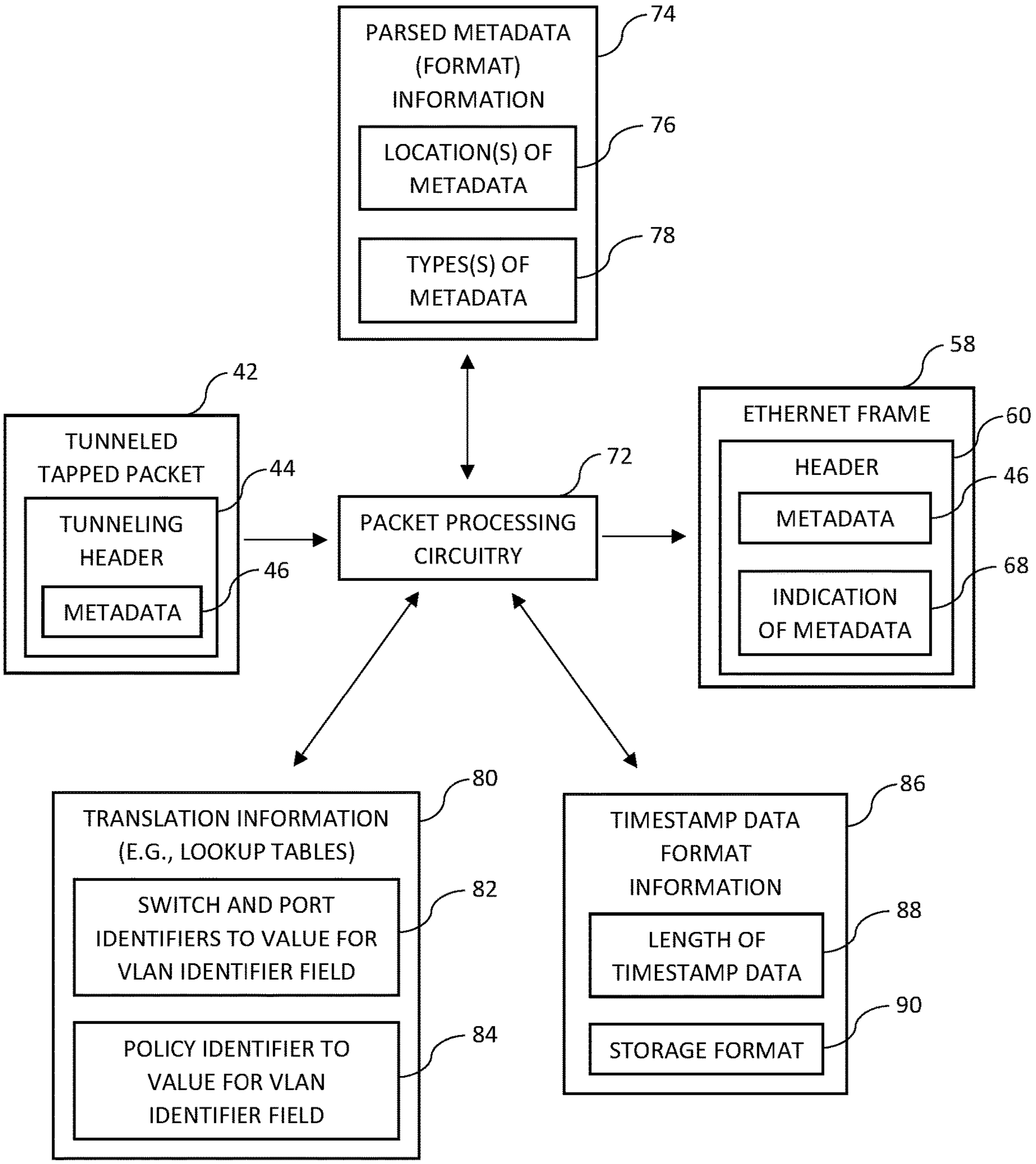
FIG. 8 is a diagram of illustrative packet processing circuitry configured to perform metadata transcoding in accordance with some embodiments.

FIG. 8 is a diagram of illustrative packet processing circuitry 72 (e.g., one or more packet processors 38 in FIG. 3) of network device 20, such as a delivery switch, configured to convert packet 42 to frame 58 at least in part by transcoding metadata from packet 42 to corresponding transcoded metadata that can be inserted into frame 58.

To facilitate the transcoding operation or generally the conversion operation, memory circuitry of network device 20 (e.g., memory circuitry 36 in FIG. 3, memory circuitry integrated as part of packet processors 38 or separate from packet processors 38, or generally memory circuitry accessible by packet processors 38) may store metadata conversion information. As described herein, metadata conversion information may include parsed metadata format information 74, translation information 80, timestamp data format information 86, and/or any other suitable information for converting metadata from one form to another.

In particular, packet processing circuitry 72 may access parsed metadata format information 74, which indicate one or more locations 76 within tunneling header 44 at which metadata 46 is present and one or more corresponding types 78 of metadata 46 at the one or more locations 76. In particular, packet processing circuitry 72 may include packet parsing circuitry that parses different portions of header 44 (e.g., based on locations 76) to determine one or more actions to be taken based on the types of metadata stored in the parsed portions of header 44.

As a first example, packet processing circuitry 72 may determine, based on a comparison of the metadata 46 with metadata format information 74, that packet 42 contains a filter switch identifier 48 (FIG. 6) and a filter port identifier 50 (FIG. 6). Responsive to this determination, packet processing circuitry 72 may perform a lookup operation using translation information 80 (e.g., stored as one or more lookup tables) to determine the appropriate translation for the filter switch and port identifiers when transcoding the information for insertion into frame 58. The memory circuitry of device 20 may store translation information 82 that maps a combination of a switch identifier and a port identifier (e.g., a switch and port pair) to a corresponding value for the fields of a VLAN tag (e.g., a first VLAN tag 64). Accordingly, packet processing circuitry 72 may insert the mapped value corresponding to the switch and port identifiers contained in header 44 into the fields of the VLAN tag in header 60. The switch and port identifiers, in combination, may have a bit length that is different from (e.g., is longer than) the bit length of the value inserted into the fields of the VLAN tag.

As a second example, packet processing circuitry 72 may determine, based on a comparison of the metadata 46 with metadata format information 74, that packet 42 contains a matching policy identifier 52 (FIG. 6). Responsive to this determination, packet processing circuitry 72 may perform a lookup operation using translation information 80 (e.g., stored as one or more look up tables) to determine the appropriate translation for the policy identifier when transcoding the information for insertion into frame 58. The memory circuitry of device 20 may store translation information 84 that maps a policy identifier to a corresponding value for the fields of a VLAN tag (e.g., a second VLAN tag 64). Accordingly, packet processing circuitry 72 may insert the mapped value corresponding to the policy identifier contained in header 44 into the fields of the VLAN tag in header 60.

As a third example, packet processing circuitry 72 may determine, based on a comparison of the metadata 46 with metadata format information 74, that packet 42 contains timestamp data 54 (FIG. 6). Responsive to this determination, packet processing circuitry 72 may perform transcoding based on timestamp data format information 86. In particular, the memory circuitry of device 20 may store, as part of information 86, a Ethernet sub-type field value indicating the insertion of timestamp data 54 (as a vendor-specific attribute) and one or more Ethernet sub-type field values each indicating a corresponding length 88 (e.g., bits of precision) for timestamp data as expected in frame 58 and a corresponding storage format 90 indicating a location (e.g., one or more particular header fields, a footer, etc.) in which the timestamp data is expected to be stored in frame 58. Accordingly, based on a lookup operation using information 86, packet processing circuitry 72 may store timestamp data 54 in a corresponding manner by including an Ethernet type field value associated with the insertion of timestamp data, by including an Ethernet sub-type field value associated with length 88 and format 90 for the inserted timestamp data, and by including actual timestamp data 54 following the Ethernet type and sub-type fields.

As examples, for a (shorter) length timestamp, packet processing circuitry 72 may insert the timestamp data as a corresponding (shortened) value in the source or destination MAC address field of header 60. In particular, in an example in which the timestamp data (to be transcoded and inserted) originally has a number of bits greater than a number of bits of a MAC address value (e.g., 48 bits), the extra bits in the timestamp data may be truncated during the transcoding process. The truncated bits may be the most significant bits. While this introduces some ambiguity into the timestamp data, it preserves the precision of the timestamp data. This introduced ambiguity may be resolved using other mechanisms such as using timestamp keyframes. Alternatively, other bits may be truncated instead. For a (longer) length timestamp, packet processing circuitry 72 may insert an indication of a presence of timestamp data in the Ethernet type and sub-type fields of header 60 and may store the longer timestamp data elsewhere in frame 58 (e.g., at one or more fields following the Ethernet type and sub-type fields, at a footer, etc.). If desired, packet processing circuitry 72 may transcode the timestamp data for storage in first and second portions (e.g., a first set of bit and a second set of bits of the timestamp data) as first and second values inserted in the source and destination MAC address fields, respectively. This approach may preserve the exact timestamp data but may lose both source and destination MAC address values (replaced by first and second portions of the timestamp data).

In some illustrative arrangements described herein, end hosts 22 of the monitoring network may perform different functions (e.g., form different tools or services), may be implemented using different devices and/or computing equipment, may be configured in different manners, and/or may generally be different from one another. Accordingly, when conveying tapped traffic to these end hosts 22, metadata conveyed in one format (e.g., as frame 58 containing transcoded metadata and/or indication(s) of the metadata in the Ethernet header) may be digestible by some end hosts 22 but not by other end hosts 22. Accordingly, packet processing circuitry (e.g., the same packet processing circuitry as in FIG. 8 or different packet processing circuitry) may be configured to perform an (egress) interface-based transcoding or conversion operation.

Figure 9:
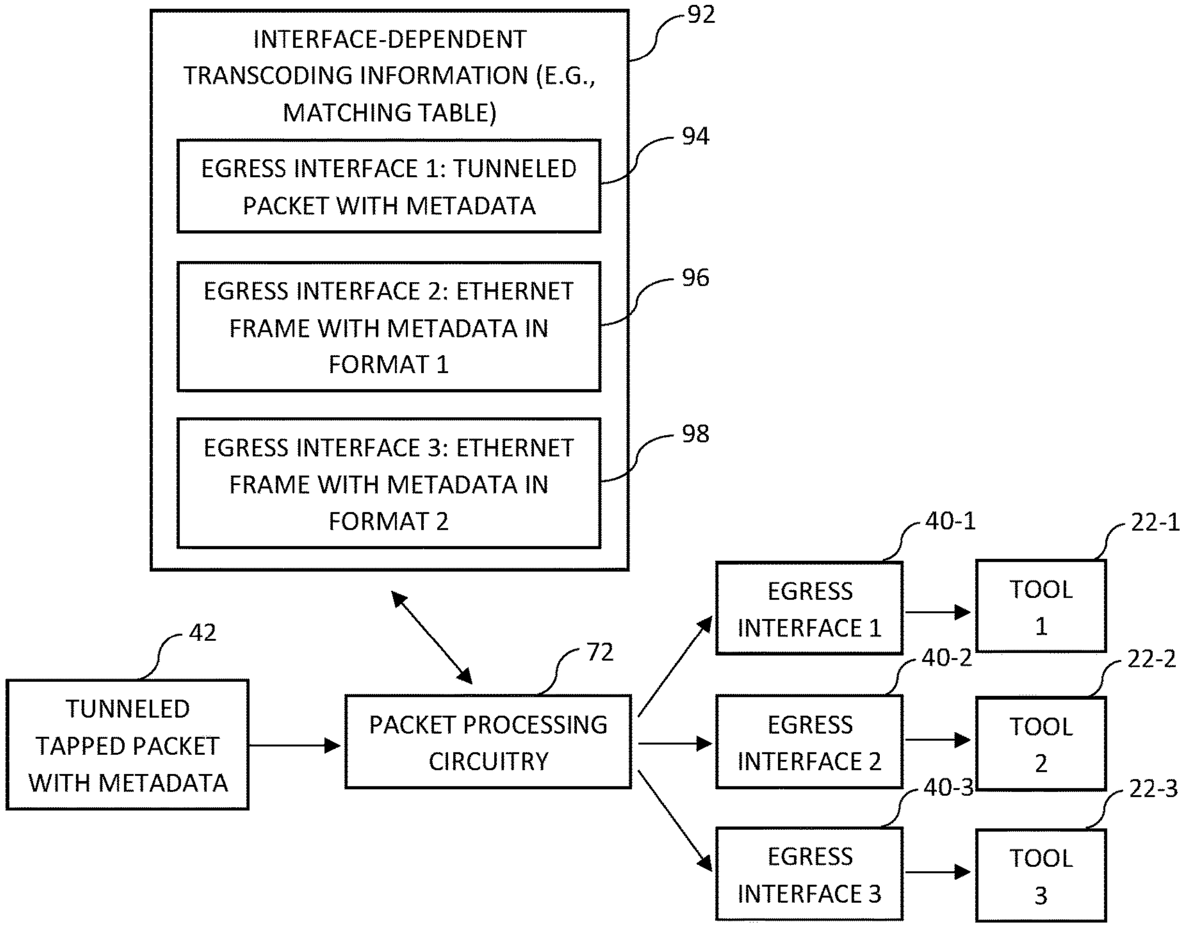
FIG. 9 is a diagram of illustrative packet processing circuitry configured to perform interface-based metadata transcoding in accordance with some embodiments.

FIG. 9 is a diagram of illustrative packet processing circuitry 72 (e.g., one or more packet processors 38 in FIG. 3) of network device 20, such as a delivery switch, configured to selectively process and transcode metadata from tunneled tapped network packet 42 based on the one or more intended egress interfaces for the tunneled tapped network packet 42. In particular, device 20 may include first, second, and third input-output interfaces 40-1, 40-2, and 40-3 (e.g., egress interfaces in the example of FIG. 9) coupled to corresponding end hosts 22-1, 22-2, and 22-3, respectively.

Upon receiving tunneled tapped packet 42 (e.g., at another input-output interface 40 serving as the ingress interface), packet processing circuitry 72 may determine forwarding destination(s) for packet 42 based on a matching policy, e.g., by parsing and examining values in one or more header fields and/or non-header fields of packet 42. In the example of FIG. 9, the memory circuitry of device 20 (e.g., memory circuitry 36 in FIG. 3, memory circuitry integrated as part of packet processors 38 or separate from packet processors 38, or generally memory circuitry accessible by packet processors 38) may store egress interface-dependent transcoding information 92 (e.g., as part of one or more match and action entries in one or more matching tables) for use by packet processing circuitry 72 in transcoding metadata. In particular, information 92 may include associations each between a particular egress interface and a corresponding traffic and/or metadata format compatible with the end host 22 coupled to the particular egress interface. As described herein, the metadata conversion information described in connection with FIG. 8 may also include interface-dependent transcoding information 92.

As examples, information 92 may include information 94 indicating that tunneled tapped network traffic with tunneling header containing the metadata should be egressed at egress interface 40-1, information 96 indicating that Ethernet traffic with a frame header containing the metadata in a first format should be egressed at egress interface 40-2, and information 98 indicating that Ethernet traffic with frame header containing the metadata in a second format should be egressed at egress interface 40-3. In particular, the first and second formats may refer to different lengths (precision) in timestamp data, different locations in the Ethernet frame header to include the timestamp data, optional transcoding or conversion of some metadata carried in the tunneled tapped traffic, and/or any other differences in carrying metadata associated with the tunneled tapped traffic to monitoring network end hosts.

Based on determining the egress interface(s) to which packet 42 should be conveyed, packet processing circuitry 72 may pass the packet in its original format for egress (e.g., if egressing at interface 40-1 based on information 94), may transcode the packet to store the metadata in a first format in the frame header of an Ethernet frame for egress (e.g., if egressing at interface 40-2 based on information 96), and/or may transcode the packet to store the metadata in a second format in the frame header of an Ethernet frame for egress (e.g., if egressing at interface 40-3 based on information 98).

Figure 10:
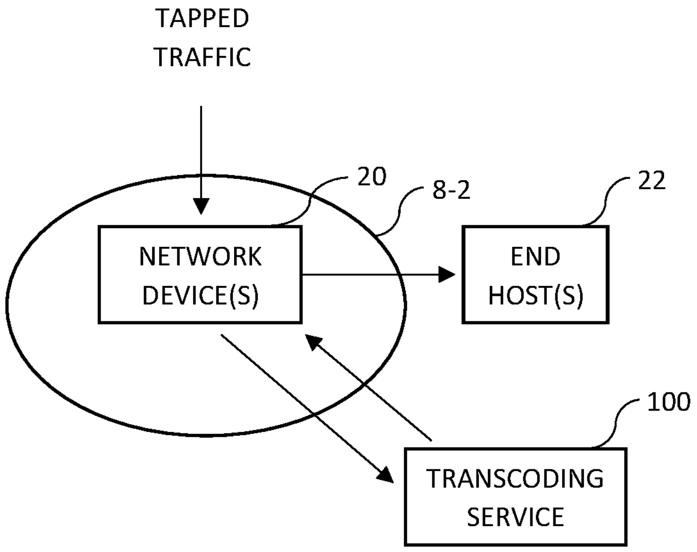
FIG. 10 is a diagram of an illustrative network configuration for a monitoring network operable with an external transcoding service in accordance with some embodiments.

If desired, some portions of packet processing circuitry 72 (e.g., perform the transcoding operations described in connection with FIGS. 8 and 9) may be implemented external to network devices 20. As shown in the example of FIG. 10, a transcoding service 100 may be coupled to one or more network devices 20 and may receive and process tunneled tapped network traffic (e.g., perform transcoding of metadata as described in connection with FIGS. 8 and 9) prior to sending the resulting packet and/or frame back to network devices 20 for forwarding to end host(s) 22. Transcoding service 100 may be implemented on any suitable computing equipment and/or on packet processors (e.g., similar to packet processor 38 in FIG. 3). In one illustrative example, transcoding service 100 may be implemented using server equipment. In another illustrative example, transcoding service 100 may be implemented using a network device (e.g., of the type shown in FIG. 3) to flexibly allocate transcoding bandwidth within the monitoring network (e.g., when a delivery switch of the type in FIG. 5 lacks sufficient transcoding bandwidth and adjacent switch implementing transcoding server 100 may perform transcoding for the delivery switch).

Figure 11:
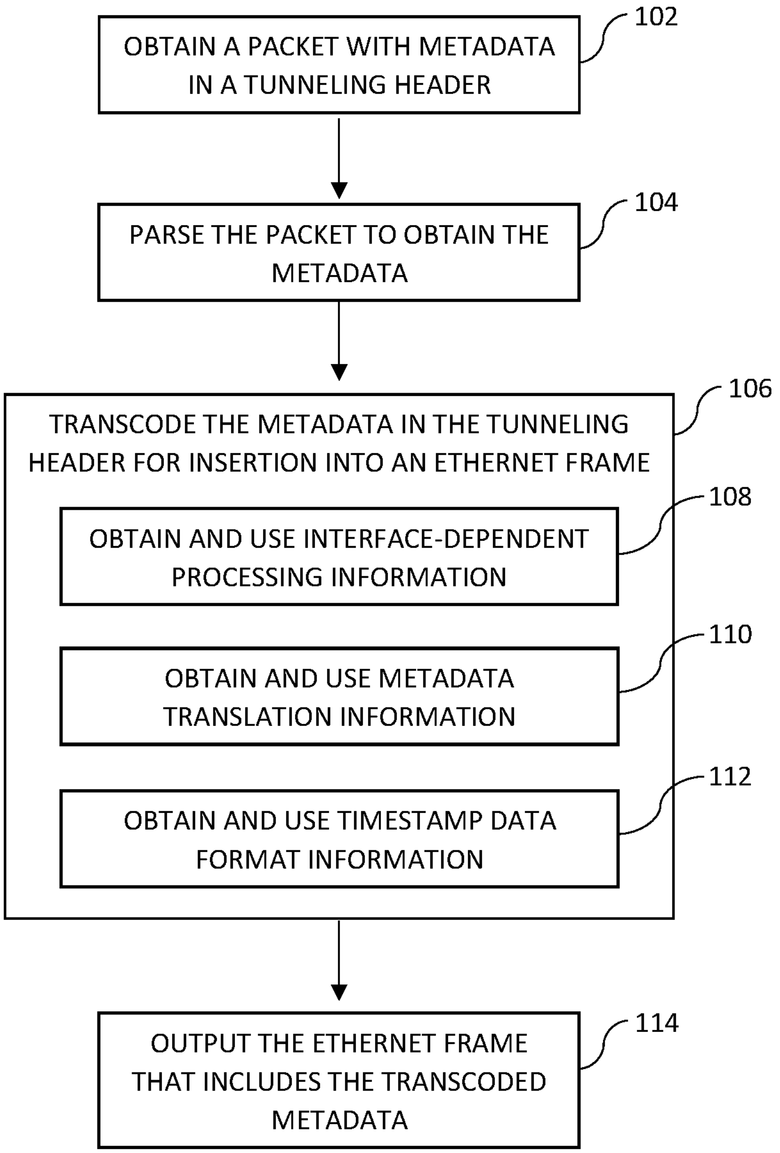
FIG. 11 is a flowchart of illustrative operations for metadata preservation in accordance with some embodiments.

FIG. 11 is a flowchart of illustrative operations performed by packet processing circuitry (e.g., formed locally on network device 20, formed as part of remote external transcoding service 100, or implemented in other suitable manners) to transcode metadata from tunneled network packets (e.g., tunneled tapped network packets from production network 8-1 in FIG. 1). These operations in FIG. 11 may be performed using one or more of components of monitoring network 8-2 such as network devices 20 in FIGS. 1, 3, and 10, switch 20-3 in FIGS. 2A, 2B, and 5, switch 20-4 in FIG. 2C, and/or transcoding service 100 in FIG. 10. The illustrative operations described in connection with FIG. 11 may generally be performed using corresponding packet processing circuitry and/or by control plane processing circuitry on these components (e.g., by executing, on the processing circuitry, software instructions stored on memory circuitry on network devices 20 and/or on server computing equipment).

At block 102, one or more processors (e.g., packet processing circuitry 72, packet processors 38, and/or processing circuitry 34) may obtain a packet with metadata in a tunneling header of the packet. The packet may be a packet tapped from a production network or may be any other type of packet.

At block 104, the one or more processors may parse the packet to obtain the metadata in the tunneling header of the packet. In particular, the one or more processors may identify the metadata in the tunneling header using information 74 in FIG. 8.

At block 106, the one or more processors may transcode or otherwise convert the metadata in the tunneling header for insertion into an Ethernet frame. In particular, the one or more processors may use information 80 and/or 86, depending on the types of metadata present for transcoding, to convert the metadata in the tunneling header to a format compatible for insertion into one or more fields of the Ethernet frame.

In some illustrative configurations, an interface-dependent (interface-based) approach may be used. In these configurations, at block 108, the one or more processors may obtain and use interface-dependent (packet) processing information (e.g., information 92 in FIG. 9) to selectively perform the transcoding operation when the egress interface is expected to egress traffic containing values resulting from the transcoding operation.

In other words, if an end host coupled to an egress interface can digest an Ethernet frame containing a header with metadata, the one or more processors may obtain and use metadata translation information (e.g., information 80 in FIG. 8) at block 110 and may obtain and use timestamp data format information (e.g., information 86 in FIG. 8) at block 112 to generate transcoded metadata in a format compliant with one or more fields of the Ethernet frame.

At block 114, the one or more processors may output the Ethernet frame that includes the transcoded metadata in the Ethernet header (e.g., for egress at an egress interface of device 20 to host 22, to be conveyed back to device 20 and into monitoring network 8-2 for forwarding to host 22 when the operations in FIG. 11 are performed by an external transcoding service, etc.).

The operations described in connection with FIG. 11 are merely illustrative. If desired, each block in the flowcharts (and the operations described therein) may occur in any suitable order (e.g., in a different order than those shown in FIG. 11) and/or one or more operations for one block may be performed concurrently with one or more operations for another block. If desired, additional operations may be performed as part of one or more blocks and/or some described operations may be omitted from one or more blocks.

The methods and operations described above in connection with FIGS. 1-11 may be performed by the components of the network device(s) and/or server or other computing equipment (e.g., network devices 20, host equipment for hosts 22, etc.) using software, firmware, and/or hardware (e.g., dedicated circuitry or hardware). Software code for performing these operations may be stored on non-transitory computer readable storage media (e.g., tangible computer readable storage media) stored on one or more of the components of the network device(s) and/or server or other computing equipment. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of the network device(s) and/or server or other computing equipment (e.g., processing circuitry 34 in FIG. 3, packet processors 38 in FIG. 3, packet processing circuitry in FIGS. 8 and 9).

The foregoing is merely illustrative and various modifications can be made to the described embodiments. The foregoing embodiments may be implemented individually or in any combination.

What is claimed is:

1. A method of preserving metadata for delivery to an end host coupled to a monitoring network, the method comprising:

obtaining, by a network device in the monitoring network, a tunneled packet having a tunneling header that includes first metadata;

converting the first metadata in the tunneling header of the tunneled packet into second metadata to be inserted into an Ethernet frame, wherein the first metadata and the second metadata contain a same type of information in different respective formats;

providing the Ethernet frame, wherein the Ethernet frame includes the second metadata converted from the first metadata in the tunneling header of the tunneled packet; and outputting the Ethernet frame, wherein the Ethernet frame is destined for the end host.

2. The method defined in claim 1, wherein the Ethernet frame includes one or more header fields, wherein the first metadata comprises a first value in a field of the tunneling header, wherein the second metadata comprises a second value in the one or more header fields of the Ethernet frame, and wherein converting the first metadata into the second metadata comprises converting the first value in the field of the tunneling header into the second value in the one or more header fields of the Ethernet frame.

3. The method defined in claim 2, wherein converting the first value into the second value comprises mapping the first value to the second value based on a lookup table.

4. The method defined in claim 2, wherein the one or more header fields of the Ethernet frame comprise fields of a Virtual Local Area Network (VLAN) tag.

5. The method defined in claim 4, wherein the first metadata comprises filter switch and port identifiers, and wherein the second value is indicative of the filter switch and port identifiers.

6. The method defined in claim 4, wherein the first metadata comprises a matching policy identifier and wherein the second value is indicative of the matching policy identifier.

7. The method defined in claim 6, wherein the Ethernet frame includes fields of an additional VLAN tag, wherein converting the first metadata into the second metadata comprises converting the first metadata into an additional value for the fields of the additional VLAN tag, wherein the first metadata comprises filter switch and port identifiers, and wherein the additional value is indicative of the filter switch and port identifiers.

8. The method defined in claim 2, wherein the one or more header fields of the Ethernet frame comprise a source Media Access Control (MAC) address field, wherein the first metadata comprises timestamp data, and wherein the second value comprises at least a portion of the timestamp data for the source MAC address field.

9. The method defined in claim 8, wherein the one or more header fields of the Ethernet frame comprise a destination MAC address field and wherein the second value comprises a remaining portion of the timestamp data for the destination MAC address field.

10. The method defined in claim 1, wherein the second metadata comprises timestamp data, wherein the Ethernet frame comprises Ethernet type and sub-type fields having a value indicative of presence of the timestamp data in the Ethernet frame, and wherein the timestamp data in the Ethernet frame follows the Ethernet type and sub-type fields.

11. The method defined in claim 10, wherein the timestamp data in the Ethernet frame is in a footer of the Ethernet frame.

12. The method defined in claim 1 further comprising:
- outputting, by the network device, the tunneled packet toward computing equipment external to the network device and configured to provide a transcoding service, wherein the first metadata is converted into the second metadata by the external computing equipment and the Ethernet frame is provided and output by the external computing equipment.

13. The method defined in claim 1, wherein the tunneling header comprises Generic Routing Encapsulation (GRE) header fields or Virtual Extensible Local Area Network (VXLAN) header fields.

14. A network device comprising:
- input-output interfaces;
- memory circuitry configured to store metadata conversion information; and
- one or more processors configured to:
  - receive, via one of the input-output interfaces, a packet, wherein the packet includes a tunneling header and wherein the tunneling header includes metadata associated with the packet;
  - perform a transcoding operation that converts the metadata in the tunneling header into transcoded metadata using the metadata conversion information;
  - provide an Ethernet frame;
  - insert the transcoded metadata into the Ethernet frame; and
  - output, via at least one of the input-output interfaces, the Ethernet frame that includes the transcoded metadata.

15. The network device defined in claim 14, wherein the metadata conversion information comprises a mapping of filter switch and port identifiers to a value for fields of a Virtual Local Area Network (VLAN) tag in the Ethernet frame.

16. The network device defined in claim 14, wherein the metadata conversion information comprises a mapping of a matching policy identifier to a value for fields of a Virtual Local Area Network (VLAN) tag in the Ethernet frame.

17. The network device defined in claim 14, wherein the metadata conversion information comprises length and format information for storing timestamp data in the Ethernet frame.

18. The network device defined in claim 14, wherein the metadata conversion information comprises format information for storing an indication of timestamp data in Ethernet type and sub-type fields in the Ethernet frame.

19. The network device defined in claim 14, wherein the one or more processors are configured to perform the transcoding operation based on an egress interface at which the Ethernet frame is output.

20. One or more non-transitory computer-readable storage media comprising computer-executable instructions that, when executed by one or more processors, cause the one or more processors to:
- receive a packet having a tunneling header, wherein the packet comprises a version of a packet in a production network that is tapped for a monitoring network coupled to the production network and wherein the tunneling header includes metadata associated with an ingress of the version of the packet into the monitoring network;
- perform a conversion operation that converts the metadata in the tunneling header into one or more values to be inserted into one or more Ethernet header fields, wherein the one or more values provide a same type of data as the metadata;
- generate an Ethernet frame having the one or more Ethernet header fields and having the one or more values, converted from the metadata in the tunneling header, in the one or more Ethernet header fields; and
- output the Ethernet frame that has the one or more values, converted from the metadata in the tunneling header, in the one or more Ethernet header fields.

* * * * *